(12) United States Patent
Wu

(10) Patent No.: US 10,734,772 B2
(45) Date of Patent: *Aug. 4, 2020

(54) MULTIFUNCTIONAL SOCKET

(71) Applicant: BESTORE EUROPE HOLDING GMBH, Zug (CH)

(72) Inventor: Wenqiang Wu, Xianning (CN)

(73) Assignee: BESTORE EUROPE HOLDING GMBH, Zug (CH)

(*) Notice: Subject to any disclaimer, the term of this patent is extended or adjusted under 35 U.S.C. 154(b) by 0 days.

This patent is subject to a terminal disclaimer.

(21) Appl. No.: 16/418,907

(22) Filed: May 21, 2019

(65) Prior Publication Data

US 2019/0273349 A1  Sep. 5, 2019

Related U.S. Application Data

(60) Division of application No. 15/921,631, filed on Mar. 14, 2018, now Pat. No. 10,340,645, which is a
(Continued)

(30) Foreign Application Priority Data

Jul. 1, 2016 (CN) .................... 2016 2 0686947 U

(51) Int. Cl.
*H01R 33/92* (2006.01)
*H01R 31/02* (2006.01)
(Continued)

(52) U.S. Cl.
CPC .............. *H01R 33/92* (2013.01); *H01R 13/05* (2013.01); *H01R 13/10* (2013.01);
(Continued)

(58) Field of Classification Search
CPC ........ H01R 33/92; H01R 13/05; H01R 13/10; H01R 13/6675; H01R 13/24;
(Continued)

(56) References Cited

U.S. PATENT DOCUMENTS 5,176,530 A * 1/1993 Reylek ............... H01R 4/26
439/290
5,658,158 A 8/1997 Milan
(Continued)

FOREIGN PATENT DOCUMENTS

| CN | 104201505 A | 12/2014 |
|---|---|---|
| CN | 205248575 U | 5/2016 |
| CN | 206022735 U | 3/2017 |

OTHER PUBLICATIONS

The Chinese First Examination Report of corresponding China patent application No. 201620686947.7, dated Oct. 28, 2016.
(Continued)

*Primary Examiner* — Harshad C Patel

(74) *Attorney, Agent, or Firm* — J.C. Patents

(57) ABSTRACT

A multifunctional socket comprises a main socket module (5) and at least two functional device modules. The functional device modules and the main socket module (5) can be assembled in any manner. At least one of the functional device modules is detachably connected to the main socket module (5). Adjacent functional device modules are detachably connected. At least one of the functional device modules and the main socket module (5) are electrically connected. The adjacent functional device modules are electrically connected. The multifunctional socket enables at least two functional device modules to be integrated into a single device, such that a user can use the components separately or combine the same in any fashion, thereby meeting the needs of the user.

14 Claims, 6 Drawing Sheets

Related U.S. Application Data continuation of application No. PCT/CN2017/087660, filed on Jun. 9, 2017.

(51) Int. Cl.

| | |
|---|---|
| H02J 50/10 | (2016.01) |
| H01R 13/05 | (2006.01) |
| H01R 13/10 | (2006.01) |
| H01R 13/66 | (2006.01) |
| H01R 25/00 | (2006.01) |
| H01R 27/02 | (2006.01) |
| H02J 7/00 | (2006.01) |
| H02J 7/02 | (2016.01) |
| H01R 13/24 | (2006.01) |
| H01R 13/62 | (2006.01) |

(52) U.S. Cl.
CPC ....... *H01R 13/6675* (2013.01); *H01R 25/006* (2013.01); *H01R 27/02* (2013.01); *H01R 31/02* (2013.01); *H02J 7/0044* (2013.01); *H02J 7/025* (2013.01); *H02J 50/10* (2016.02); *H01R 13/24* (2013.01); *H01R 13/6205* (2013.01)

(58) Field of Classification Search
CPC .. H01R 13/6205; H01R 25/006; H01R 27/02; H01R 31/02; H02J 50/10; H02J 6/0044; H02J 7/025
USPC ....... 439/39, 607.23, 715, 541.5, 540.1, 686
See application file for complete search history.

(56) References Cited

U.S. PATENT DOCUMENTS

| | | | |
|---|---|---|---|
| 5,885,109 A | 3/1999 | Lee et al. | |
| 6,727,477 B1 | 4/2004 | Li-Chen | |
| 7,435,094 B2 | 10/2008 | Chang | |
| 7,497,740 B2* | 3/2009 | Mei | H01R 13/514 200/51 R |
| 7,658,613 B1* | 2/2010 | Griffin | H01R 13/6205 439/39 |
| D639,742 S * | 6/2011 | Doucet | D13/139.8 |
| 8,172,580 B1 | 5/2012 | Chen et al. | |
| 8,226,444 B2 | 7/2012 | Chow | |
| 8,536,829 B2* | 9/2013 | Chen | H02J 7/0045 320/108 |
| 9,065,205 B2* | 6/2015 | Gao | H01R 13/5808 |
| D777,674 S | 1/2017 | Mininger et al. | |
| 2002/0094708 A1* | 7/2002 | Budman | H01R 12/585 439/82 |
| 2003/0176100 A1 | 9/2003 | Yurek et al. | |
| 2004/0196663 A1* | 10/2004 | Ishida | H01L 25/0753 362/539 |
| 2005/0170678 A1 | 8/2005 | Donahue, IV | |
| 2007/0072443 A1* | 3/2007 | Rohrbach | G06F 1/1633 439/39 |
| 2008/0013329 A1* | 1/2008 | Takeda | F21K 9/00 362/459 |
| 2013/0191671 A1* | 7/2013 | Yamanaka | G06F 1/3228 713/323 |
| 2015/0001937 A1 | 1/2015 | Wang | |
| 2015/0099381 A1 | 4/2015 | Ma | |
| 2016/0064987 A1* | 3/2016 | Sheu | H02J 7/025 320/108 |

OTHER PUBLICATIONS

The Chinese Second Examination Report of corresponding China patent application No. 201620686947.7, dated Dec. 6, 2016.
The International Search Report of corresponding International PCT Application No. PCT/CN2017/087660, dated Aug. 30, 2017.

* cited by examiner

MULTIFUNCTIONAL SOCKET

CROSS-REFERENCE TO RELATED APPLICATIONS

This application is a divisional application of U.S. patent application Ser. No. 15/921,631, filed on Mar. 14, 2018, which is a continuation of International Application No. PCT/CN2017/087660, filed on Jun. 9, 2017. The International Application claims priority to Chinese Patent Application No. 20162068947.7, filed on Jul. 1, 2016. All of the aforementioned patent applications are hereby incorporated by reference in their entireties.

TECHNICAL FIELD

The present disclosure relates to the technical field of electrical appliances, in particular to a multifunctional socket.

BACKGROUND

At present, the function of the socket on the market is relatively simple. One socket cannot satisfy users who need to use a variety of devices, thus cannot meet the growing human needs.

SUMMARY

The main purpose of the present disclosure is to provide a multifunctional socket which is intended to achieve a plurality of functional device modules to be integrated into a single device, such that a user can use the components separately or combine the same in any fashion. In order to achieve the above purpose, the present disclosure provides a multifunctional socket, including a main socket module and at least two functional device modules, the functional device modules and the main socket module can be assembled in any manner, at least one of the functional device modules is detachably connected to the main socket module, adjacent functional device modules are detachably connected, at least one of the functional device modules and the main socket module are electrically connected, and the adjacent functional device modules are electrically connected.

Further, the at least one of the functional device modules is connected to the main socket module through magnetic attraction, and the adjacent functional device modules are connected through magnetic attraction.

Further, the at least one of the functional device modules is electrically connected to the main socket module through a connector, and the adjacent functional device modules are electrically connected through a connector.

Further, the main socket module and/or the at least one of the functional device modules are provided with an independent rechargeable battery and a charging port.

Further, the main socket module and/or the at least one of the functional device modules are both provided with wireless modules inside.

Further, a side wall of the main socket module is provided with a wirelessly connected start button, a plurality of USB interfaces, and a plurality of power supply jacks.

Further, the functional device module and the main socket module are stacked, and the main socket module is located at a bottom of the multifunctional socket.

Further, the connector comprises a slot and a pin, the pin is located at an axial center of the main socket module and the slot is located at an axial center of the functional device module.

Further, the functional device module includes a wireless charging module, and the wireless charging module includes a wireless charging base.

Further, a top or a peripheral side of the wireless charging module is provided with a slot, and the wireless charging base is arranged in the slot.

Further, a peripheral side of the wireless charging module is provided with a slide rail, a storage member is slidably arranged on the slide rail, the storage member is provided with a storage compartment, and the wireless charging base is arranged on a bottom surface of the storage compartment.

Further, the wireless charging module is provided with a magnetic member.

Further, the functional device module further includes a router module, a Bluetooth speaker module and a lighting module.

Further, the multifunctional socket further includes a base, at least one of the main socket modules and/or the functional device module is detachably connected to the base.

In the technical solution of the present disclosure, the adjacent functional device modules and the functional device modules are detachably connected to the main socket module, and the functional device modules and the main socket module are assembled in any manner, such that the at least two functional device modules are integrated into a single device and the user can use the components separately or combine the same in any fashion, thereby meeting the needs of the user.

BRIEF DESCRIPTION OF DRAWINGS

In order to illustrate the embodiments of the present disclosure or the technical solutions of the prior art more clearly, the following will be the brief introduction of the accompanying drawings required in the embodiments or in the description of the prior art. Apparently, the accompanying drawings described below are only some embodiments of the present disclosure. Other accompanying drawings can be obtained by those skilled in the art without inventive labor according to the structures shown in the accompanying drawings.

REFERENCE SIGNS OF THE PRESENT DISCLOSURE

Figure 1:
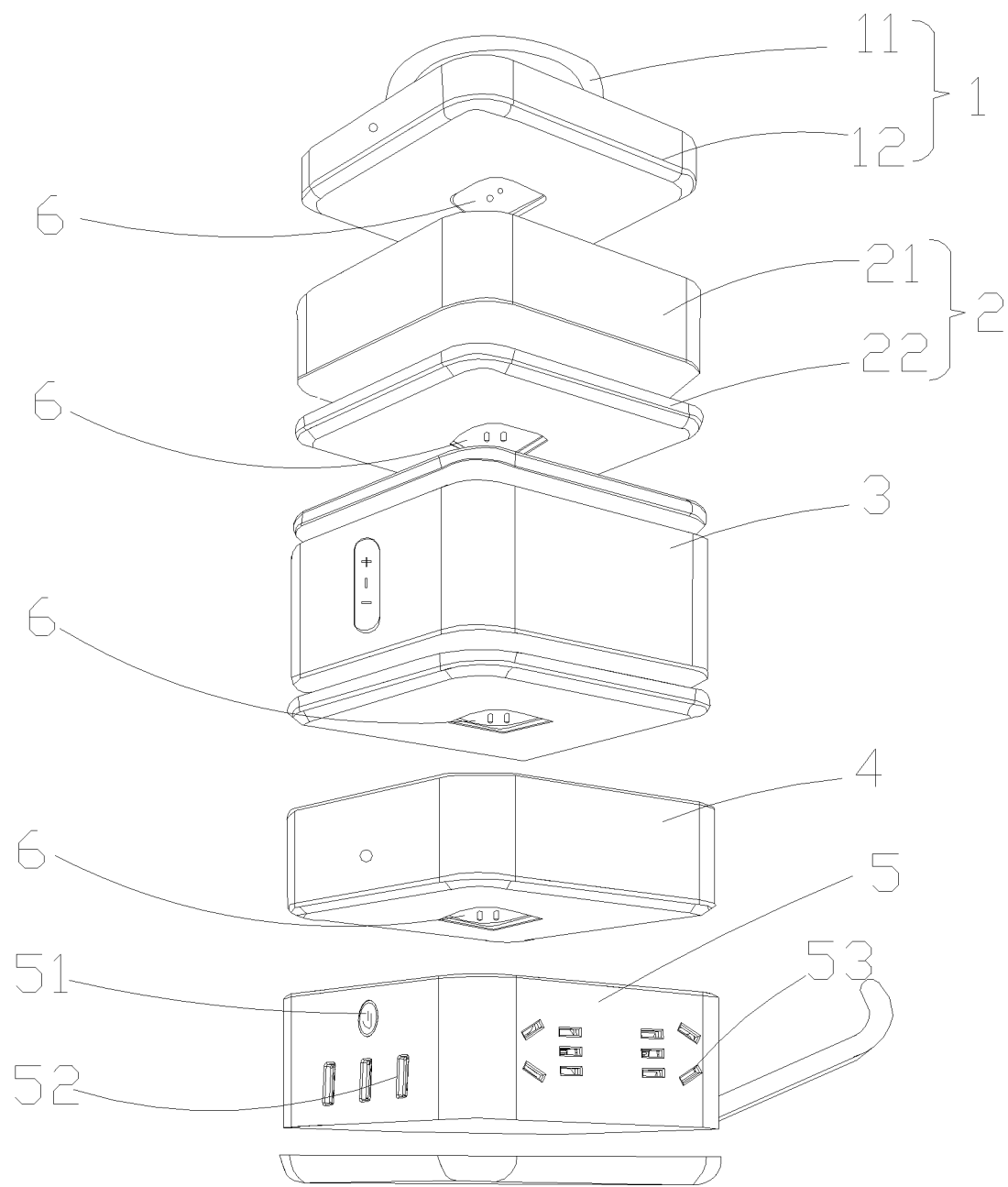
FIG. 1 is a structural diagram of an exploded structure of a multifunctional socket according to a first embodiment of the present disclosure.

| | |
|---|---|
| Wireless charging module 1 | Lighting module 2 |
| Bluetooth speaker module 3 | Router module 4 |
| Main socket module 5 | Wireless charging silicone pad 11 |
| Wireless charging base 12 | Slot 13 |
| Visual window 14 | Storage member 15 |
| Storage compartment 16 | Transparent cover 21 |
| Lamp body 22 | Wireless connection starting button 51 |
| USB interface 52 | Power supply jack 53 |

The achievement of the purpose, functional features and advantages of the present disclosure will be further illustrated in combination with the embodiments and with reference to the accompanying drawings.

DESCRIPTION OF EMBODIMENTS

The technical solutions of the embodiments of the present disclosure will be clearly and completely described below with referring to the accompanying drawings in the embodiments of the present disclosure. Apparently, the described embodiments are part of the embodiments of the present disclosure, rather than all of the embodiments. Based on the embodiments of the present disclosure, all other embodiments obtained by those skilled in the art without inventive labor are within the protection scope of the present disclosure.

It should be noted that all the directional indicators (such as up, down, left, right, front, rear . . . ) in the embodiments of the present disclosure are only used to explain the relative position relationship, the movement condition and the like between components in a specific posture (as shown in the drawings). If the specific posture is changed, the directivity indication also changes accordingly.

In addition, the descriptions related to "first", "second" and the like in the present disclosure are merely for the purpose of description and cannot be understood as indicating or implying the relative importance thereof or implicitly indicating the number of the indicated technical features. Therefore, the features defined with "first" and "second" can explicitly or implicitly include at least one of the features. In addition, the technical solutions between the each embodiment can be combined with each other, but they must be on the basis that those skilled in the art can achieve it. When the combinations of the technical solutions appear contradictory or cannot be achieved, it should be considered that the combination of the technical solutions does not exist and does not within the scope of the protection claimed by the present disclosure.

The First Embodiment

The first embodiment of the present disclosure provides a multifunctional socket.

Please refer to FIG. 1, in the first embodiment of the present disclosure, the multifunctional socket includes a main socket module 5 connected to an external power supply and at least two functional device modules. The functional device modules and the main socket module 5 are assembled in a stacked manner. At least one of the functional device modules is detachably connected to the main socket module 5. Adjacent functional device modules are detachably connected. At least one of the functional device modules and main socket module 5 are electrically connected through a connector 6. The adjacent functional device modules are electrically connected through a connector.

The connector 6 can be a pin connector or a USB and the like. In this implementation manner, the connector 6 is a pin connector (POGOPin). The pin connector (POGOPin) is a spring probe formed through the three basic components a pin shaft, a spring, and a pin tube after being riveted and pressed by a precise instrument. The pin connector (POGOPin) has a precise spring structure inside. The pin connector (POGOPin) contacts with a copper wall through the pin to achieve energization or conduction.

In the technical solutions of the present disclosure, the adjacent functional device modules are detachably connected and the functional device modules are detachably connected to the main socket module 5. The main socket module 5 or the functional device module is electrically conductive through a pin connector 6 (POGOPin). Where the pin connector 6 (POGOPin) has a slot and a pin, the slot may be arranged on one functional device module, and the pin may be arranged on the other functional device module, when the pin and the slot are connected, the pin and the copper wall of the slot contact with each other and thus achieving energization or conduction, such that the two functional device modules are integrated into a single device; further, the functional device module and the main socket module 5 are arranged in a stacked structure of building blocks, and at least one module can be superimposed on any combination of the original modules to achieve any combination and superposition, where the at least one module may include one or more of the following modules: a router module, a Bluetooth speaker module, a lighting module, an air purifying module, a camera module, a radio module, a multimedia playing module, and the like. The users can use one of the modules independently or use the multifunctional socket of the present disclosure in a solution of a DIY combination according to their own needs.

Optionally, a slot and a pin of a pin connector (POGOPin) are respectively located on axial centers of the main socket module 5 and the functional device module. For example, the pin of the pin connector (POGOPin) is located at an axial center of the main socket module 5, and the slot of the pin connector (POGOPin) is located at an axial center of the functional device module.

Optionally, the pin connector (POGOPin) has the force of magnetic attraction. The pin of the pin connector (POGOPin) is located at the axial center of the main socket module 5 and the slot of the POGOPin is located at the axial center of the functional device module. The main socket module 5 is connected to the functional device module or the at least two functional device modules are connected to each other, with the axis positions being magnetically attracted. As the magnetic attraction can provide an effective and easy connection between the modules, modules with different functions may be added onto the main socket module or the functional device module conveniently, therefore, the function of the main socket module can thereby be expanded conveniently. In addition, the respective functional device modules, and the respective functional device modules and the main socket module 5 are connected in terms of structure through magnetic attraction, and they can also be connected in terms of structure by means of clamping, plugging, screwing, and the like. Optionally, the respective functional device modules, and the respective functional device modules and the main socket module 5 are electrically connected through metal components instead of the pin connector, thus the metal components for electrical connection and structural connectors is integrated together. For example, the respective functional device modules, and the respective functional device modules and the main socket module 5 are connected through thread, such that the electrical connection and the structurally fixed connection can be simultaneously achieved through the thread.

Optionally, the side wall of the main socket module 5 is provided with a wireless connection starting button 51, a plurality of USB interfaces 52, and a plurality of power supply jacks 53.

In the embodiment, the main socket module 5 at least has a jack power supply function, a wireless connection function and a USB power supply/charging function, and the three functions are integrated. The power supply jacks 53 have two hole type and three hole type and they electrically deliver electricity to household appliances. The main socket module 5 has a wireless module inside, the wireless module is connected to the wireless connection starting button 51, and remotely controls the functional device modules by connecting to a smart phone or a tablet computer via home or other WIFI networks under the condition of networking; a plurality of USB interfaces 52 and USB data cables can be directly inserted into the USB interfaces 52 to achieve power supply/charging function.

Optionally, the functional device module includes a router module 4, a Bluetooth speaker module 3, a lighting module 2, and a wireless charging module 1. The wireless charging module 1 is located on the top of the multifunctional socket, and the main socket module 5 is located at the bottom of the multifunctional socket.

In the embodiment, one of the functional device modules has one or more functions such as a router, a Bluetooth speaker, an illumination, a wireless charging and the like, and each of the functional device modules has a different function. Where the wireless charging module 1 is located on the top of the multifunctional socket, a product such as a phone and the like which needs to be charged needs to be placed on a surface of the wireless charging module 1. The user can choose the functional module/modules for use according to their own needs.

Optionally, one of the functional device modules is connected to the main socket module 5 through magnetic attraction instead of being connected thereto through the pin connector, or through magnetic attraction and the pin connector, similarly, the adjacent functional device modules may also be connected through magnetic attraction instead of being connected thereto through the pin connector, or through magnetic attraction and the pin connector.

In the embodiment, the interconnection surfaces of the adjacent functional device modules (a lower surface of the functional device module arranged above and an upper surface of the functional device module arranged below) may be formed of magnetic attracting materials, thereby the adjacent functional device modules can attract to each other, similarly, the interconnection surfaces of the functional device module and the main socket module 5 may also be formed of magnetic attracting materials, the functional device module and the main socket module 5 can also attract to each other, thereby increasing the stability of the multifunctional socket. Obviously, the design is not limited to this, but can also be to respectively provide insert legs and jacks on the two interconnected surfaces to achieve the matching connection, thereby increasing the stability of the interconnection as well.

Optionally, the lighting module 2 includes a lamp body 22 and a transparent cover 21 covering the lamp body 22.

The lighting module 2 is a night lamp. Obviously, the design is not limited to this, and may also be a desk lamp or an indicator lamp. In the embodiment, the lighting module 2 is divided into a lamp body 22 and a transparent cover 21. A cover side of the transparent cover 21 is buckled to a side wall of the lamp body 22, and the light source emits from the lamp body 22.

Optionally, the wireless charging module 1 includes a wireless charging base 12 and a wireless charging silicon pad 11.

In the embodiment, the wireless charging module 1 and the wireless charging base 12 adopt a wireless charging technology and utilize an alternating current of a transmitting coil in the wireless charging base 12 to generate magnetic resonance, so as to transmit electrical energies in an electric field and a magnetic field between the wireless charging base 12 and the device. The wireless charging silicon pad 11 is located on a top surface of the wireless charging base 12. The device pad on the wireless charging silicon pad 11 can resist shock, slip, pressure and antistatic. The wireless charging silicon pad 11 also has the heat-resistance effect.

In order to ensure the stability of the combination of the at least two functional device modules, in the implementation manner, the multifunctional socket further includes a base, and at least one of the main socket module and/or the functional device modules is connected to the base. And the base can also be connected to an external power supply to charge and supply power to the multifunctional socket.

The Second Embodiment

The second embodiment of the present disclosure provides a multifunctional socket.

Please refer to FIGS. 2 to 6, in the second embodiment of the present disclosure, the multifunctional socket includes a main socket module 5 and at least two functional device modules. The functional device modules and the main socket module 5 are combined in any fashion. At least one of the functional device modules is detachably connected to the main socket module 5. Adjacent functional device modules are detachably connected. At least one of the functional device modules and main socket module 5 are electrically conductive. Adjacent functional device modules are electrically conductive.

In the multifunctional socket of the second embodiment, one of the functional device modules and the main socket module 5 are electrically connected through the connector 6, and the adjacent functional device modules are also electrically connected through the connector.

The above connector 6 can be a pin connector or a USB and the like. In this implementation manner, the connector 6 is a pin connector (POGOPin). The pin connector (POGOPin) is a spring probe formed through the three basic components a pin shaft, a spring, and a pin tube after being riveted and pressed by a precise instrument. The pin connector (POGOPin) has a precise spring structure inside. The pin connector (POGOPin) contacts with a copper wall through the pin to achieve energization or conduction.

In the technical solutions of the present disclosure, the adjacent functional device modules are detachably connected and the functional device modules are detachably connected to the main socket module 5. The main socket module 5 or the functional device module is electrically conductive through a pin connector 6 (POGOPin). Where the pin connector 6 (POGOPin) has a slot and a pin, the slot may be arranged on one functional device module, and the pin may be arranged on the other functional device module, when the pin and the slot are connected, the pin and the copper wall of the slot contact with each other and thus achieving energization or conduction, such that the two functional device modules are integrated into a single device.

It can be understood that the functional device module and the main socket module 5 can be arranged in a stacked structure of blocks, or can be arranged in parallel tile, or can also be arranged in any other combination except the stacked arrangement and the tiled arrangement. The users can use one of the modules independently or use the multifunctional socket of the present disclosure in a solution of a DIY combination according to their own needs.

In other embodiments which are not shown, the main socket module 5 and the functional device modules are all provided with USB interfaces. At least one of the functional device modules and the main socket module 5 are electrically conductive through a USB data cable. The adjacent functional device modules are also electrically conductive through a USB data cable. By virtue of the USB data cable connection, the situation of face to face contact between the main socket module 5 and the functional device module and between the adjacent functional device modules is avoided. Users can autonomously arrange according to the usage environment of the multifunctional socket of the present disclosure.

In the second embodiment, at least one of the functional device modules may be connected to the main socket module 5 through magnetic attraction instead of being connected thereto through the pin connector, or through magnetic attraction and the pin connector, similarly, the adjacent functional device modules may also be connected through magnetic attraction instead of being connected thereto through the pin connector, or through magnetic attraction and the pin connector.

In the embodiment, the interconnection surfaces of the adjacent functional device modules (a lower surface of the functional device module arranged above and an upper surface of the functional device module arranged below) may be formed of magnetic attracting materials, thereby the adjacent functional device modules can attract to each other, similarly, the interconnection surfaces of the functional device module and the main socket module 5 may also be formed of magnetic attracting materials, the functional device module and the main socket module 5 can also attract to each other, thereby increasing the stability of the multifunctional socket. Obviously, the design is not limited to this, but can also be to respectively provide insert legs and jacks on the two interconnected surfaces to achieve the matching connection, thereby increasing the stability of the interconnection as well.

Please refer to FIGS. 2 to 6, in the embodiment, the functional device module includes a router module 4, a Bluetooth speaker module 3, a lighting module 2, and a wireless charging module 1. It can be understood that, in other implementations, the functional device modules further include one or more of the following modules: an air purifying module, a camera module, a radio module, a multimedia playing module, and the like, so as to achieve the multifunctional socket with multiple functions of the present disclosure.

In the embodiment, a wireless module is provided in the main socket module 5 and/or at least one of the functional device modules, users can connect the module with wireless module to a mobile terminal such as a smart phone or a tablet by using a home or other WIFI network, to remotely control the module with wireless module under the condition of networking. The wireless module is selected from at least one of a WIFI module, a Bluetooth module, an infrared module, a 4G module, and the like. Further, each of the main socket module 5 and/or the at least one functional device module is provided with a separate rechargeable battery and a charging port for charging the rechargeable battery, at the same time, the charging port can also supply power to each of the functional device modules and the main socket module 5. The main socket module 5 and each of the functional device modules can be independently charged with the charging port being connected to an external power supply, and the rechargeable battery provided in the main socket module 5 can also be configured to charge or directly supply power to the functional device module, moreover, the adjacent functional device modules can be mutually charged or power can be directly supplied thereto. The main socket module 5 is also provided with one or more power supply ports for supplying power to other electric devices.

The wireless charging module 1 is configured to charge a device that needs to be charged, such as a mobile phone. In the embodiment, take a mobile phone as the charging device for example. The wireless charging module 1 includes a wireless charging base 12, and the wireless charging base 12 adopts a wireless charging technology and utilizes an alternating current of a transmitting coil in the wireless charging base 12 to generate magnetic resonance, so as to transmit electrical energies in an electric field and a magnetic field between the wireless charging base 12 and the device.

In the first embodiment, a charging device such as a mobile phone is placed on the top of the wireless charging module 1 for charging. Please refer to FIG. 4, in the second embodiment, in addition to the wireless charging structure provided in the above first embodiment, that is, the device is arranged on the top of the wireless charging module 1 for charging. It also provides three other charging structures, all of which can achieve the function that the wireless charging module 1 charges the device.

Figure 2:
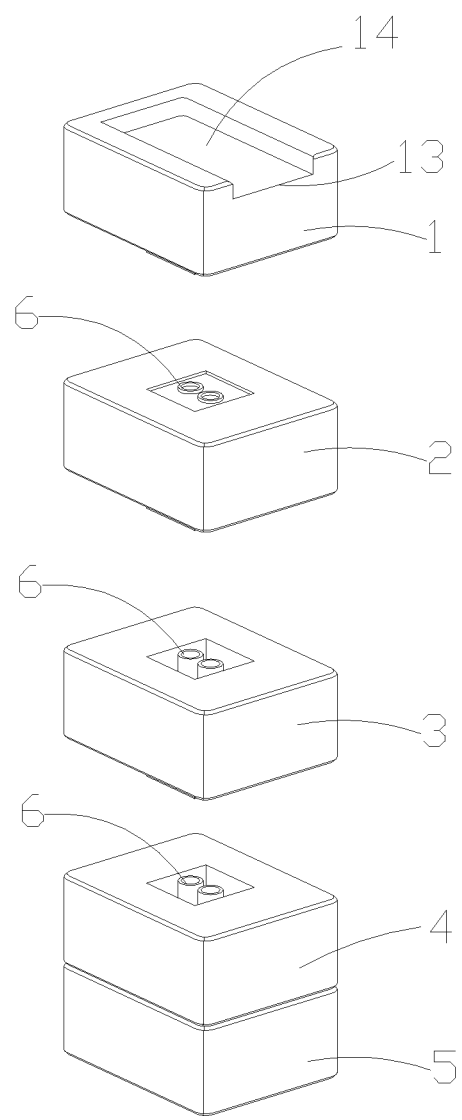
FIG. 2 is a structural diagram of an exploded structure of a first kind of multifunctional socket according to a second embodiment of the present disclosure; (a wireless charging module using a charging structure 1)
Figure 5:
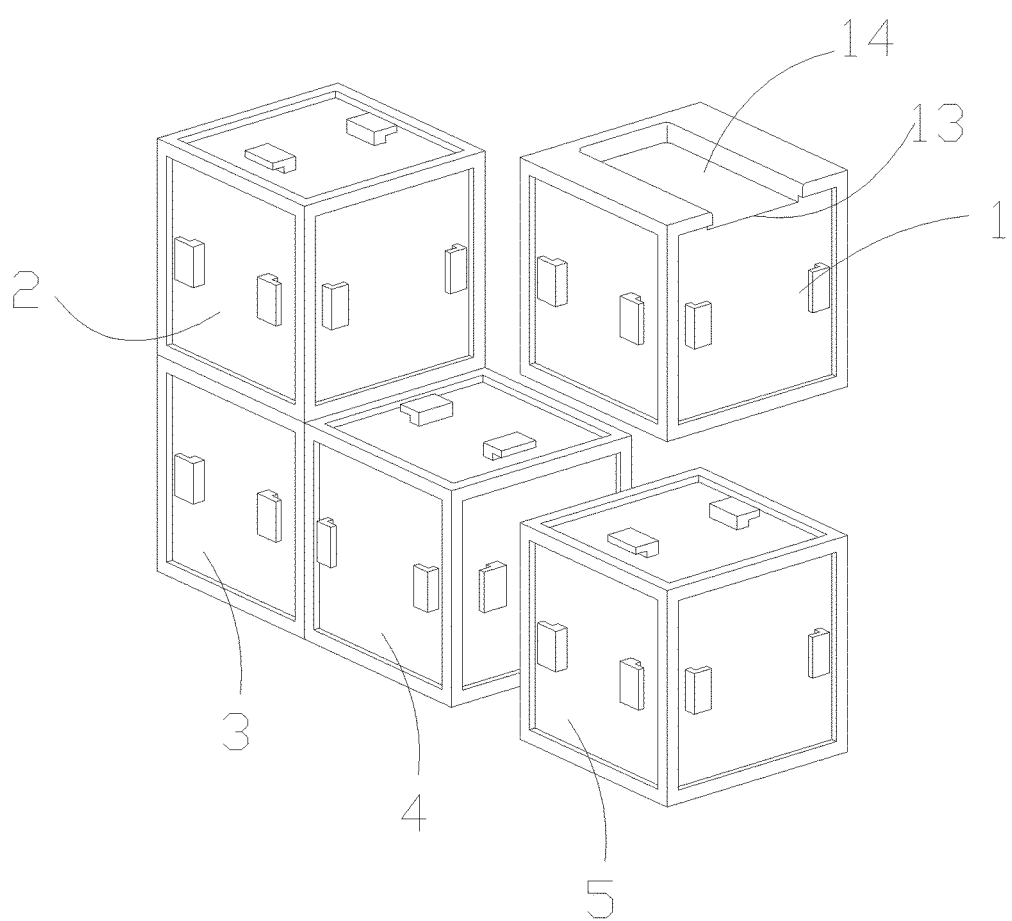
FIG. 5 is a structural diagram of another exploded structure of the multifunctional socket shown in FIG. 2; (the wireless charging module using the charging structure 1)

Structure 1: please refer to FIG. 2 and FIG. 5, the top or the peripheral side of the wireless charging module is provided with a slot 13, and the wireless charging base (not shown) is arranged in the slot 13. The exterior of the wireless charging module 1 corresponding to a wireless charging base is provided with a visual window 14. The user can insert the mobile phone into the slot 13 for charging. At the same time, the screen of the mobile phone corresponds to the visual window 14, thereby facilitating the user to control or check the mobile phone screen through the visual window 14. Optionally, a wireless charging silicon pad (not shown) is also arranged at the bottom of the slot 13 to play an antiskid role on the mobile phone and prevent it from slipping off.

Figure 3:
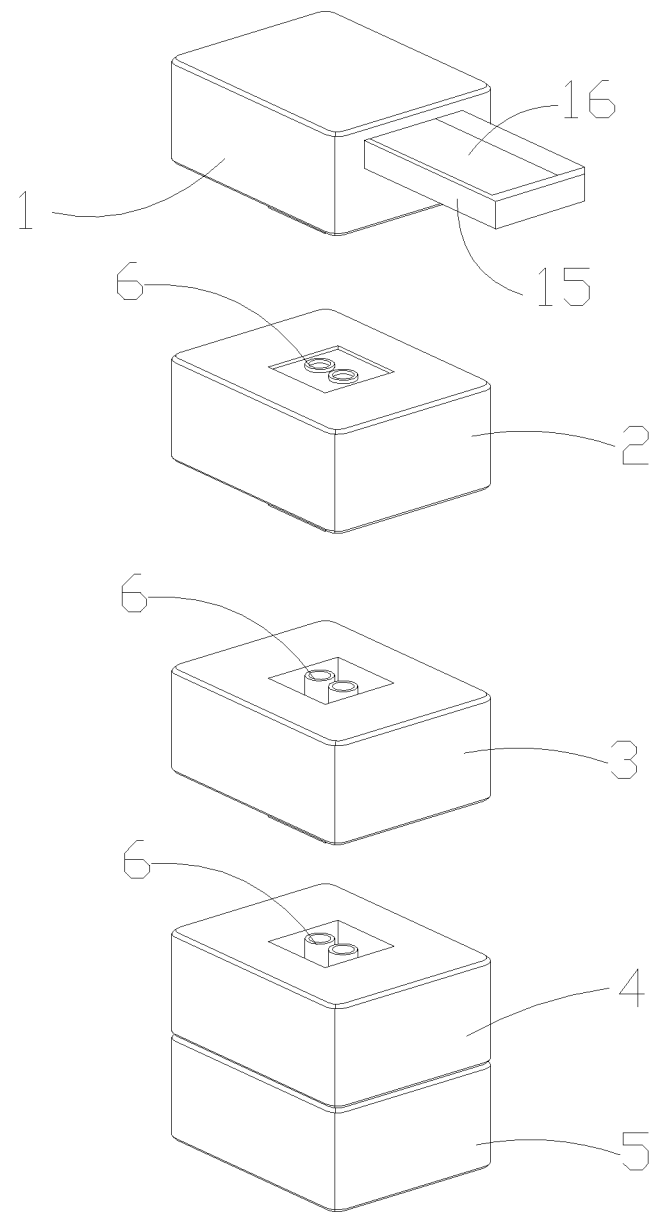
FIG. 3 is a structural diagram of an exploded structure of a second kind of multifunctional socket according to the second embodiment of the present disclosure; (a wireless charging module using a charging structure 2)
Figure 4:
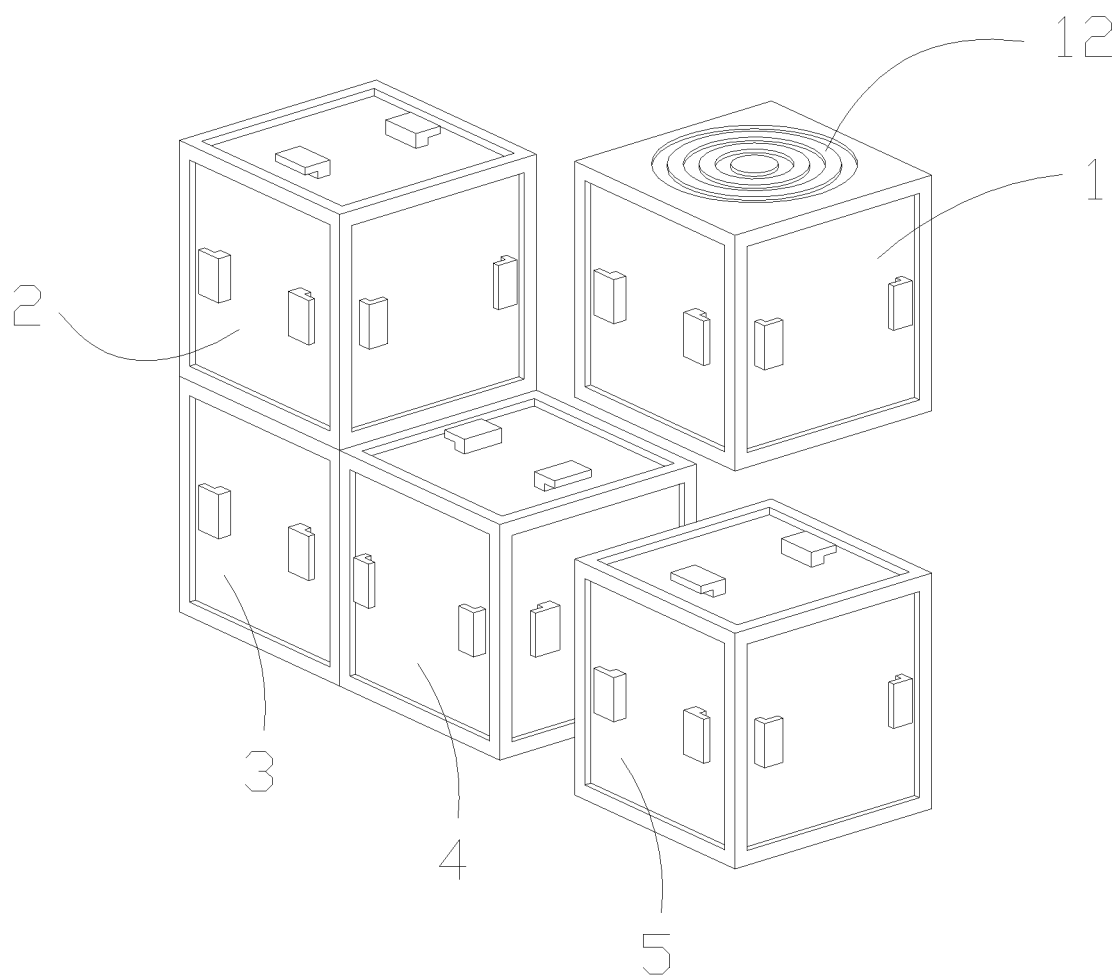
FIG. 4 is a structural diagram of an exploded structure of a third kind of a multifunctional socket according to the second embodiment of the present disclosure; (a wireless charging module using a charging structure shown in FIG. 1)
Figure 6:
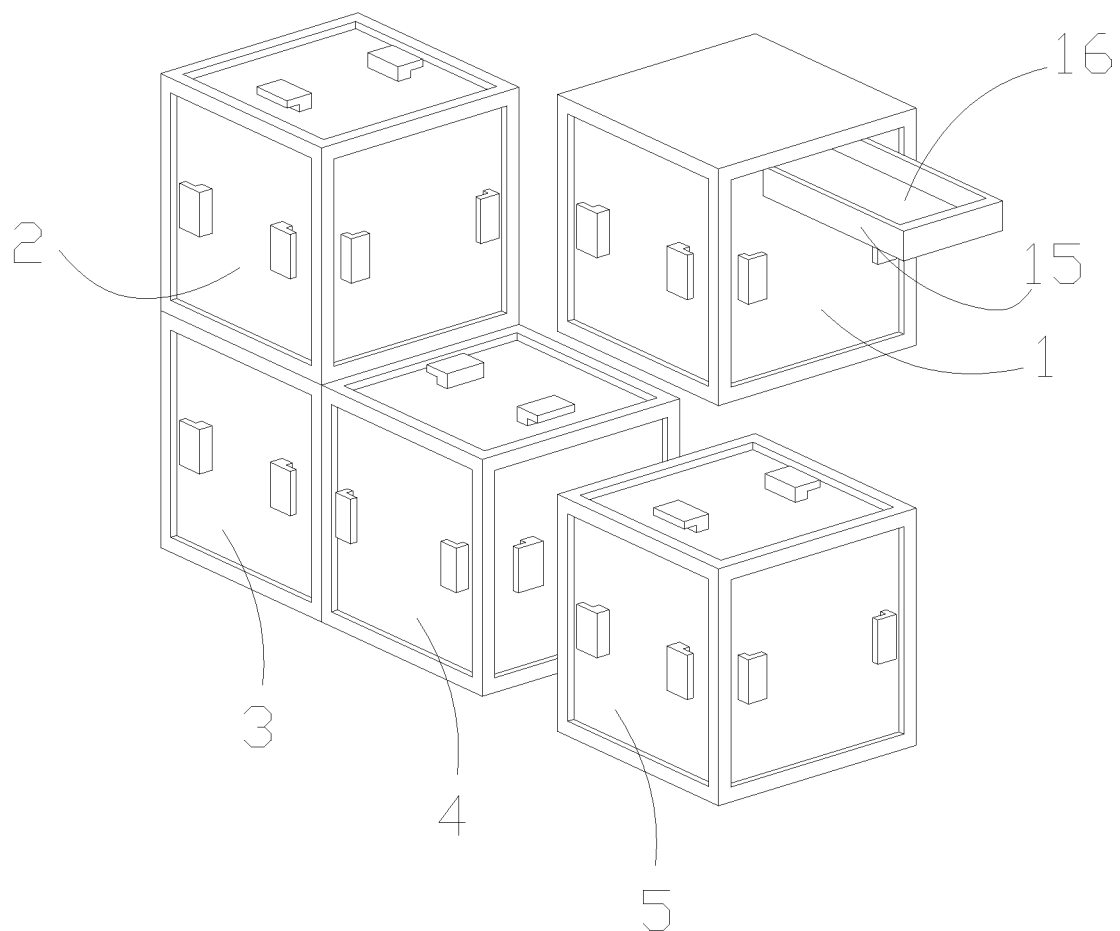
FIG. 6 is a structural diagram of another exploded structure of the multifunctional socket shown in FIG. 3. (the wireless charging module using the charging structure 2)

Structure 2: please refer to FIG. 3 and FIG. 6, the peripheral side of the wireless charging module 1 is provided with a slide rail (not shown). A storage member 15 is slidably arranged on the slide rail, and the storage member 15 can slide along the slide rail and received in the wireless charging module 1. The storage member 15 is provided with a storage compartment 16 for placing a mobile phone. When the bottom of the storage compartment 6 is provided with a wireless charging base (not shown) for charging, the mobile phone is placed in the storage compartment 16, and then the storage member 15 slides into the wireless charging module 1. The phone is charged under the effect of the wireless charging base.

Structure 3: a wireless charging base (not shown) is arranged in the wireless charging module 1. A magnetic member is arranged on the peripheral side of the wireless charging module 1. The mobile phone is directly adsorbed on the peripheral side of the wireless charging module 1 under the magnetic force of the magnetic member, so as to be charged under the effect of the wireless charging base.

It can be understood that the above wireless charging structure of the wireless charging module 1 is applicable no matter whether the functional device module and the main socket module 5 are arranged in a stacked manner, or in a tile manner, or in any other combination except the stacked arrangement and the tiled arrangement. Please refer to FIGS. 2 to 6 for details. In addition, as for the embodiments of the present disclosure, the multifunctional socket of the present disclosure enables at least two functional device modules to be integrated in a single device. Users can use them independently or in any combination to meet their needs. The above are only the preferred embodiments of the present disclosure, and do not limit the scope of the patent of the present disclosure patent. All the equivalent structures alternately made through using the description and drawing contents under the inventive concept of the present disclosure, or those made directly or indirectly using the technical solutions in other related technical fields are included in the protection scope of the patent of the present disclosure patent.

What is claimed is:

1. A multifunctional socket, comprising:
   a main socket module configured to connect to an external power supply, and
   at least two functional device modules;
   wherein the main socket module and the functional device modules are assembled in a stacked manner, the functional device module at the bottommost is detachably connected to the main socket module, the adjacent functional device modules are detachably connected with each other, a lower surface of each functional device module is a first surface, each one of the first surfaces is matched with a second surface formed by an upper surface of the corresponding functional device module or an upper surface of the main socket module, a center portion of each first surface is provided with a pin, a center portion of each second surface is provided with a slot, an electrical connection between the functional device module at the bottommost and the main socket module and an electrical connection between the adjacent functional device modules are achieved by correspond pins and slots;
   wherein the functional device modules comprise a wireless charging module, the wireless charging module is located on the top of the multifunctional socket, and the main socket module is located at the bottom of the multifunctional socket;
   wherein a side of the wireless charging module is provided with a slide rail, a storage member is slidably arranged on the slide rail, the storage member is provided with a storage compartment, and a wireless charging base is arranged on a bottom surface of the storage compartment.

2. The multifunctional socket according to claim 1, wherein the first surfaces and the second surfaces are square shapes.

3. The multifunctional socket according to claim 1, wherein each first surface defines a groove, the pins are located in the corresponding grooves.

4. The multifunctional socket according to claim 1, wherein the functional device module at the bottommost is connected to the main socket module through magnetic attraction, and the adjacent functional device modules are connected with each other through magnetic attraction.

5. The multifunctional socket according to claim 4, wherein the first surfaces and the second surfaces are formed of magnetic attracting materials.

6. The multifunctional socket according to claim 1, wherein the main socket module and/or the at least one of the functional device modules are provided with an independent rechargeable battery and a charging port.

7. The multifunctional socket according to claim 1, wherein the main socket module and/or the at least one of the functional device modules are provided with a wireless module inside.

8. The multifunctional socket according to claim 1, wherein a side wall of the main socket module is provided with a wireless connection starting button.

9. The multifunctional socket according to claim 1, wherein a side wall of the main socket module is provide with a plurality of USB interfaces and a plurality of power supply jacks.

10. The multifunctional socket according to claim 1, wherein the functional device modules comprise at least two of a router module, a Bluetooth speaker module, a lighting module, an air purifying module, a camera module, a radio module, and a multimedia playing module.

11. The multifunctional socket according to claim 1, a wireless charging silicon pad is located on an upper surface of the wireless charging base.

12. The multifunctional socket according to claim 1, wherein the wireless charging module is provided with a magnetic member.

13. The multifunctional socket according to claim 1, wherein the functional device modules comprises a lighting module, the lighting module comprises a lamp body and a transparent cover covering the lamp body.

14. The multifunctional socket according to claim 1, further comprising a base, wherein the main socket module is detachably connected to the base.

\* \* \* \* \*